(12) United States Patent
Wang et al.

(10) Patent No.: US 10,014,717 B2
(45) Date of Patent: Jul. 3, 2018

(54) POWER SUPPLY DEVICE AND POWER SUPPLY METHOD IN DATA CENTER

(71) Applicant: Huawei Technologies Co., Ltd., Shenzhen (CN)

(72) Inventors: Shaohua Wang, Shenzhen (CN); Zhen Qin, Shenzhen (CN); Yi Zeng, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 136 days.

(21) Appl. No.: 15/078,193

(22) Filed: Mar. 23, 2016

(65) Prior Publication Data

US 2016/0285307 A1 Sep. 29, 2016

(30) Foreign Application Priority Data

Mar. 24, 2015 (CN) .......................... 2015 1 0130539

(51) Int. Cl.
H02J 9/06 (2006.01)
H02J 7/34 (2006.01)

(52) U.S. Cl.
CPC ................ H02J 9/061 (2013.01); H02J 7/34 (2013.01)

(58) Field of Classification Search
CPC ....................................................... H02J 9/06
See application file for complete search history.

(56) References Cited

U.S. PATENT DOCUMENTS 8,493,020 B2 * 7/2013 Lee ..................... H01M 10/465
307/66
2009/0206670 A1 8/2009 Whitted et al.
2011/0140667 A1 6/2011 Moon
2011/0148194 A1 6/2011 Lai et al.
2013/0221897 A1 8/2013 Brabec
2013/0254568 A1 9/2013 Hou et al.
2015/0180232 A1* 6/2015 Mino ....................... H02J 1/08
307/23

FOREIGN PATENT DOCUMENTS

| CN | 202651874 U | 1/2013 |
| CN | 203086179 U | 7/2013 |
| CN | 103872701 A | 6/2014 |
| JP | 4340843 B2 | 10/2009 |
| WO | 2008145212 A1 | 12/2008 |

OTHER PUBLICATIONS

Machine Translation and Abstract of Chinese Publication No. CN202651874, Jan. 2, 2013, 7 pages.
Machine Translation and Abstract of Chinese Publication No. CN203086179, Jul. 24, 2013, 13 pages.

* cited by examiner

Primary Examiner — Hai L Nguyen
(74) Attorney, Agent, or Firm — Conley Rose, P.C.

(57) ABSTRACT

A power supply device and a power supply method in a data center, and the power supply device includes at least two busbars, where a first busbar of the two busbars is connected to a first battery, a second busbar of the two busbars is connected to a second battery, and a voltage level of the first battery is different from a voltage level of the second battery, and at least one first bidirectional direct current converter configured to connect the first busbar and the second busbar such that the first busbar and the second busbar perform electrical energy transmission using the first bidirectional direct current converter.

19 Claims, 4 Drawing Sheets

POWER SUPPLY DEVICE AND POWER SUPPLY METHOD IN DATA CENTER

CROSS-REFERENCE TO RELATED APPLICATION

This application claims priority to Chinese Patent Application No. 201510130539.3, filed on Mar. 24, 2015, which is hereby incorporated by reference in its entirety.

TECHNICAL FIELD

Embodiments of the present disclosure relate to the field of a communications device, and in particular, to a power supply device and a power supply method in a data center.

BACKGROUND

An uninterruptible power supply (UPS) gradually becomes a trend in a power supply solution in a data center because of relatively high whole-process power supply efficiency and relatively high power supply reliability. An increasingly high requirement is imposed on reliability of the data center, and a requirement on a data center already reaches a tier 4 (an annual mean down time does not exceed 24 min). Therefore, a new requirement is imposed on reliability of power supply to the data center, which not only requires low efficiency of each power supply part, but also requires a longer backup time of a battery.

Currently, a power supply method in the data center is performing backup at a power-supply input end to implement higher reliability. However, a battery pack used for backup can supply backup power to a load of only one voltage level. In this case, low utilization of the battery pack is caused.

SUMMARY

Embodiments of the present disclosure provide a power supply device and a power supply method in a data center, which can improve utilization of a battery pack.

According to a first aspect, a power supply device in a data center is provided, including at least two busbars, where a first busbar of the at least two busbars is connected to a first battery, a second busbar of the at least two busbars is connected to a second battery, and a voltage level of the first battery is different from a voltage level of the second battery, and at least one first bidirectional direct current converter configured to connect the first busbar and the second busbar such that the first busbar and the second busbar perform electrical energy transmission using the at least one first bidirectional direct current converter.

With reference to the first aspect, in a first possible implementation manner of the first aspect, the power supply device further includes a direct current power source and a third battery, where the direct current power source and the third battery are connected to the first busbar using a direct current converter, and a second bidirectional direct current converter, where one end of the second bidirectional direct current converter is connected to the third battery, and the other end is connected to the first busbar or the second busbar.

With reference to the first aspect or the first possible implementation manner of the first aspect, in a second possible implementation manner of the first aspect, the first bidirectional direct current converter is separately and directly connected to the first busbar and the second busbar.

With reference to the first aspect or either possible implementation manner of the first to the second possible implementation manners of the first aspect, in a third possible implementation manner of the first aspect, the at least two busbars include at least one third busbar, the first busbar and the second busbar are connected to the at least one third busbar using at least two first bidirectional direct current converters, and the first bidirectional direct current converter is connected between any two busbars of the first busbar, the second busbar, and the at least one third busbar.

According to a second aspect, a power supply method in a data center is provided, a power supply device to which the method is applied includes at least two busbars and at least one first bidirectional direct current converter, where a first busbar of the at least two busbars is connected to a first battery, a second busbar of the at least two busbars is connected to a second battery, a voltage level of the first battery is different from a voltage level of the second battery, and the first busbar is connected to the second busbar using the at least one first bidirectional direct current converter, and the method includes, when a fault occurs in power supply to the first busbar, supplying, by at least one of the second busbar, the first battery, and the second battery, power to the first busbar, or when a fault occurs in power supply to the second busbar, supplying, by at least one of the first busbar, the first battery, and the second battery, power to the second busbar.

With reference to the second aspect, in a first possible implementation manner of the second aspect, the power supply device further includes a direct current power source, a third battery, and a second bidirectional direct current converter, where the direct current power source and the third battery are connected to the first busbar using a direct current converter, one end of the second bidirectional direct current converter is connected to the third battery, and the other end is connected to the first busbar or the second busbar, and the method further includes, when a fault occurs in power supply to the first busbar, supplying, by the third battery, power to the first busbar, or when a fault occurs in power supply to the second busbar, supplying, by the third battery, power to the second busbar.

In the embodiments of the present disclosure, busbars connected to batteries of different voltage levels are connected using a bidirectional converter, that is, a battery pack that supplies power to loads of different voltage levels is connected using the bidirectional converter, and therefore, energy can be scheduled between different battery packs without a need to perform backup at an input end. Therefore, in an equipment room of a data center, when an exception occurs in one path of power supply, backup time optimization of the batteries is implemented by means of energy scheduling, which improves utilization of the battery packs.

BRIEF DESCRIPTION OF DRAWINGS

To describe the technical solutions in the embodiments of the present disclosure more clearly, the following briefly introduces the accompanying drawings required for describing the embodiments. The accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. The described embodiments are some but not all of the embodiments of the present disclosure. All other embodiments obtained by a person of ordinary skill in the art based on the embodiments of the present disclosure without creative efforts shall fall within the protection scope of the present disclosure.

A data center is a globally-agreed specific device network, and is used to transfer, display, calculate, and store data information in a network infrastructure. The data center not only includes a computer system and other ancillary devices (for example, a communications system and a storage system), but also includes a redundant data communication connection, an environment control device, a monitoring device, and various security apparatuses.

Figure 1:
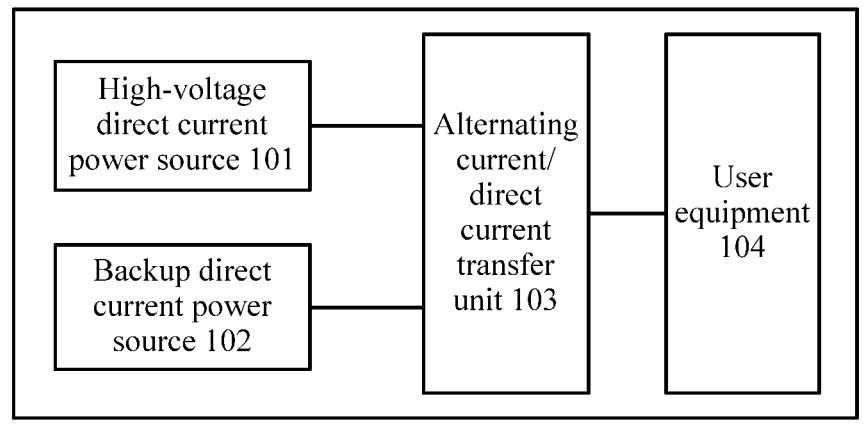
FIG. 1 is a schematic block diagram of a scenario to which an embodiment of the present disclosure is applicable.

FIG. 1 is a schematic block diagram of a scenario to which an embodiment of the present disclosure is applicable. The scenario includes a high-voltage direct current power source 101, a backup direct current power source 102, an alternating current/direct current transfer unit 103, and user equipment 104.

The high-voltage direct current power source 101 is connected to the alternating current/direct current transfer unit 103, the backup direct current power source 102 is connected to the alternating current/direct current transfer unit 103, and the alternating current/direct current transfer unit 103 is connected to the user equipment 104.

Alternating current/direct current transfer is performed, using the alternating current/direct current transfer unit 103, on a direct current supplied by the high-voltage direct current power source 101 and an alternating current supplied by the backup direct current power source 102, and then the direct current and the alternating current are transported to the user equipment 104.

Figure 2:
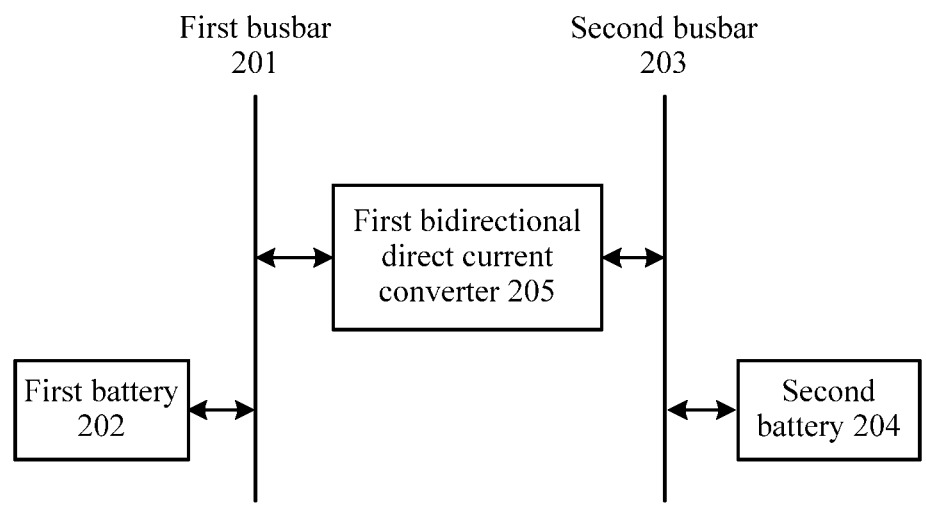
FIG. 2 is a schematic block diagram of a power supply device in a data center according to an embodiment of the present disclosure.

FIG. 2 is a schematic block diagram of a power supply device in a data center according to an embodiment of the present disclosure. The power supply device may include at least two busbars, where a first busbar 201 of the at least two busbars is connected to a first battery 202, a second busbar 203 of the at least two busbars is connected to a second battery 204, and a voltage level of the first battery 202 is different from a voltage level of the second battery 204, and at least one first bidirectional direct current converter 205 configured to connect the first busbar 201 and the second busbar 203 such that the first busbar 201 and the second busbar 203 perform electrical energy transmission using the at least one first bidirectional direct current converter 205.

In this embodiment of the present disclosure, busbars connected to batteries of different voltage levels are connected using a bidirectional converter, that is, battery packs that supply power to loads of different voltage levels are connected using the bidirectional converter, and therefore, energy can be scheduled between different battery packs without a need to perform backup at an input end. In this case, when an exception occurs in one line of power supply in an equipment room of a data center, backup time optimization of the batteries is implemented by means of energy scheduling, which improves utilization of the battery packs.

A power source may supply power to a load using a busbar, batteries connected to the busbar may be a battery pack, and the batteries may be used to supply backup power to the load. In other words, when a fault occurs in power supply of the power source, the batteries may be used as temporary backup power sources to supply backup power.

A voltage level of the first battery is different from a voltage level of the second battery, that is, a power supply voltage of the first battery is different from a power supply voltage of the second battery. A battery can supply power to a device of only one voltage level, and therefore, a backup time is limited by a battery capacity.

It should be understood that the first busbar and the second busbar may be any two busbars of the at least two busbars. In this embodiment of the present disclosure, only a device related to the present disclosure is described, and the power supply device may further include another device, such as a direct current power distributor, a direct current load, or an alternating current load, which are not listed one by one herein for ease of description.

Furthermore, the load may include a direct current load and an alternating current load, where a direct current power distribution apparatus may be connected between a busbar and the direct current load, and a direct current (DC)/alternating current (AC) converter is connected between a busbar and the alternating current load, that is, a direct current is input and an alternating current is output. An AC/DC converter may be connected between a busbar and an alternating current power source, or an AC/DC converter may be connected between a busbar and another alternating current power source. Another direct current power source may also supply power to a busbar, and a DC/DC converter may be connected between the busbar and the other direct current power source.

The first bidirectional direct current converter is configured to perform energy transmission between busbars. A bidirectional direct current converter is a bidirectional reversible direct current/direct current converter, that is, voltages that may be separately supplied by busbars may be increased or decreased between the busbars. That is, by increasing or decreasing the voltages, a battery connected to a busbar may supply power to another busbar, thereby increasing a backup time.

The first busbar 201 and the second busbar 203 may be connected using at least one first bidirectional direct current converter. The connection manner may be a manner of a direct connection, may be a manner of an indirect connection, or may be a manner of combining a direct connection and an indirect connection, which is not limited in this embodiment of the present disclosure. A connection manner in FIG. 2 shows only the manner of a direct connection.

Optionally, in another embodiment, the first bidirectional direct current converter is separately and directly connected to the first busbar and the second busbar.

Furthermore, if the connection manner is the manner of a direct connection, the first busbar 201 and the second busbar 203 are directly connected using one first bidirectional direct current converter 205. It should be understood that any two busbars of the at least two busbars may be connected using one first bidirectional direct current converter 205, or some busbars of the at least two busbars may be selected to be directly connected, which is not limited in this embodiment of the present disclosure. In other words, a quantity of first bidirectional direct current converters 205 may be determined according to a requirement. For example, if any two busbars of N busbars are directly connected using a bidirectional direct current converter, N×(N−1)/2 bidirectional direct current converters are required to implement a pairwise connection between the N busbars, where N is a positive integer greater than 2. Optionally, in another embodiment, some bidirectional direct current converters may be removed in this embodiment of the present disclosure, that is, which two busbars require a bidirectional direct current converter in between is set according to a requirement.

Optionally, in another embodiment, the at least two busbars in the power supply device may include at least one third busbar, the first busbar and the second busbar are connected to the at least one third busbar using at least two first bidirectional direct current converters, and the first bidirectional direct current converter is connected between any two busbars of the first busbar, the second busbar, and the at least one third busbar.

Furthermore, if the connection manner is a manner of an indirect connection, when there is one third busbar, two bidirectional direct current converters may be required. One bidirectional direct current converter may be separately connected to the first busbar and the third busbar, and the other bidirectional direct current converter may be separately connected to the second busbar and the third busbar. When there are two third busbars, three bidirectional direct current converters may be required. One bidirectional direct current converter is separately connected to the first busbar and the first third busbar, another bidirectional direct current converter is separately connected to two third busbars, and the last bidirectional direct current converter may be separately connected to the second third busbar and the second busbar. A quantity of third busbars is not limited in this embodiment of the present disclosure, which are not described one by one herein.

Optionally, in another embodiment, the connection manner of the first busbar and the second busbar in this embodiment of the present disclosure may include a manner of a direct connection, and may also include a manner of an indirect connection. For example, the first busbar and the second busbar are directly connected using one bidirectional direct current converter. In addition, the first busbar and the third busbar may be directly connected using another bidirectional direct current converter, and the third busbar and the second busbar may be directly connected using yet another bidirectional direct current converter. That is, three bidirectional direct current converters may be required to interconnect the three busbars.

When a fault occurs in power supply to the first busbar, the second busbar, the first battery, and the second battery may supply power to the first busbar. When a fault occurs in power supply to the second busbar, the first busbar, the first battery, and the second battery may supply power to the second busbar.

Figure 3:
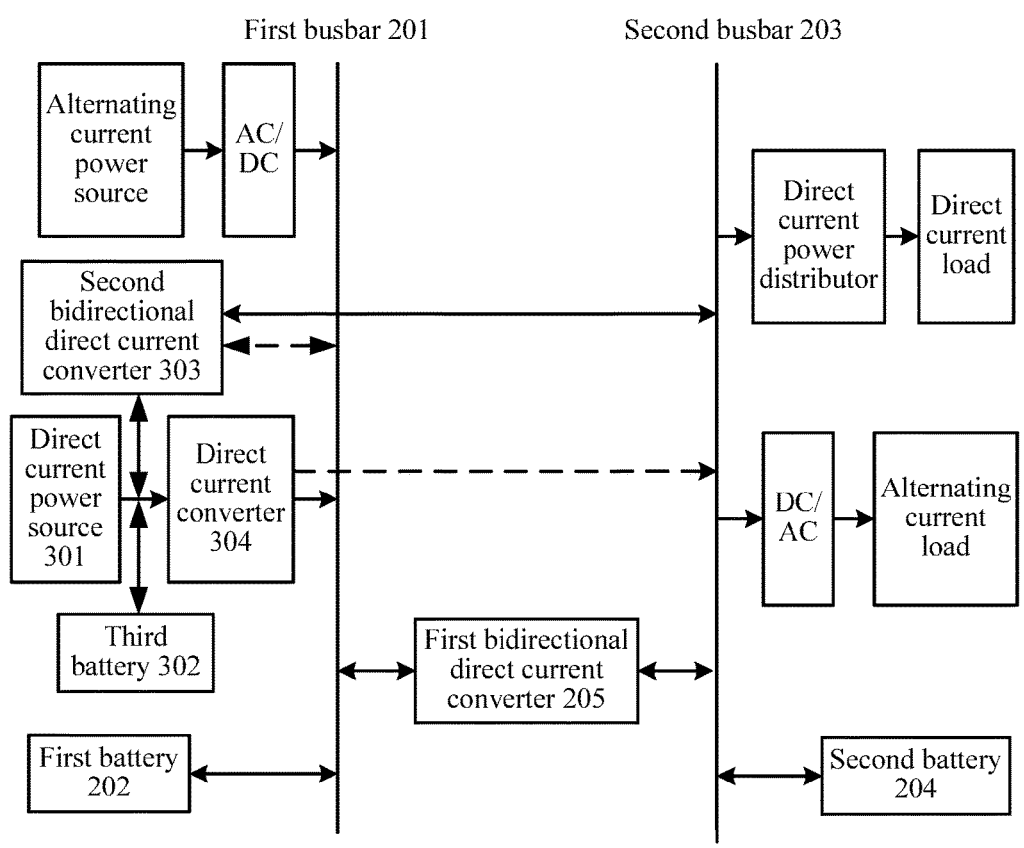
FIG. 3 is a schematic block diagram of a power supply device in a data center according to another embodiment of the present disclosure.

FIG. 3 is a schematic block diagram of a power supply device in a data center according to another embodiment of the present disclosure. A device in FIG. 3 same as FIG. 2 may use a same number, and the power supply device shown in FIG. 3 may further include a direct current power source 301, a third battery 302, and a second bidirectional direct current converter 303.

The direct current power source 301 and the third battery 302 are connected to a first busbar 201 using a direct current converter 304, one end of the second bidirectional direct current converter 303 is connected to the third battery 302, and the other end is connected to the first busbar 201 or a second busbar 203.

It should be understood that the direct current converter 304 that is connected to the direct current power source 301 and the first busbar 201 may be a unidirectional direct current converter.

The second bidirectional direct current converter 303 may be connected to the first busbar 201 or may be connected to the second busbar 203, and the direct current converter 304 may be connected to the first busbar 201, or may be connected to the second busbar 203, which is not limited in this embodiment of the present disclosure.

The first busbar 201 and the second busbar 203 shown in FIG. 3 may be directly connected using a first bidirectional direct current converter 205.

It should also be understood that the first busbar 201 and the second busbar 203 may be any two busbars of the at least two busbars. In this embodiment of the present disclosure, only a device related to the present disclosure is described, and the power supply device may further include another device, such as an alternating current power source, an AC/DC converter, a direct current power distributor, a direct current load, or an alternating current load, which are not listed one by one herein for ease of description.

Furthermore, the load may include a direct current load and an alternating current load, where a direct current power distribution apparatus may be connected between a busbar and a direct current load, and a DC/AC converter is connected between a busbar and an alternating current load, that is, a direct current is input and an alternating current is output. An AC/DC converter may be connected between a busbar and an alternating current power source, or an AC/DC converter may be connected between a busbar and another alternating current power source. Another direct current power source may also supply power to a busbar, and a DC/DC converter may be connected between the busbar and the other direct current power source.

When a fault occurs in power supply to the first busbar, the third battery may supply power to the first busbar; when a fault occurs in power supply to the second busbar, the third battery supplies power to the second busbar.

Figure 4:
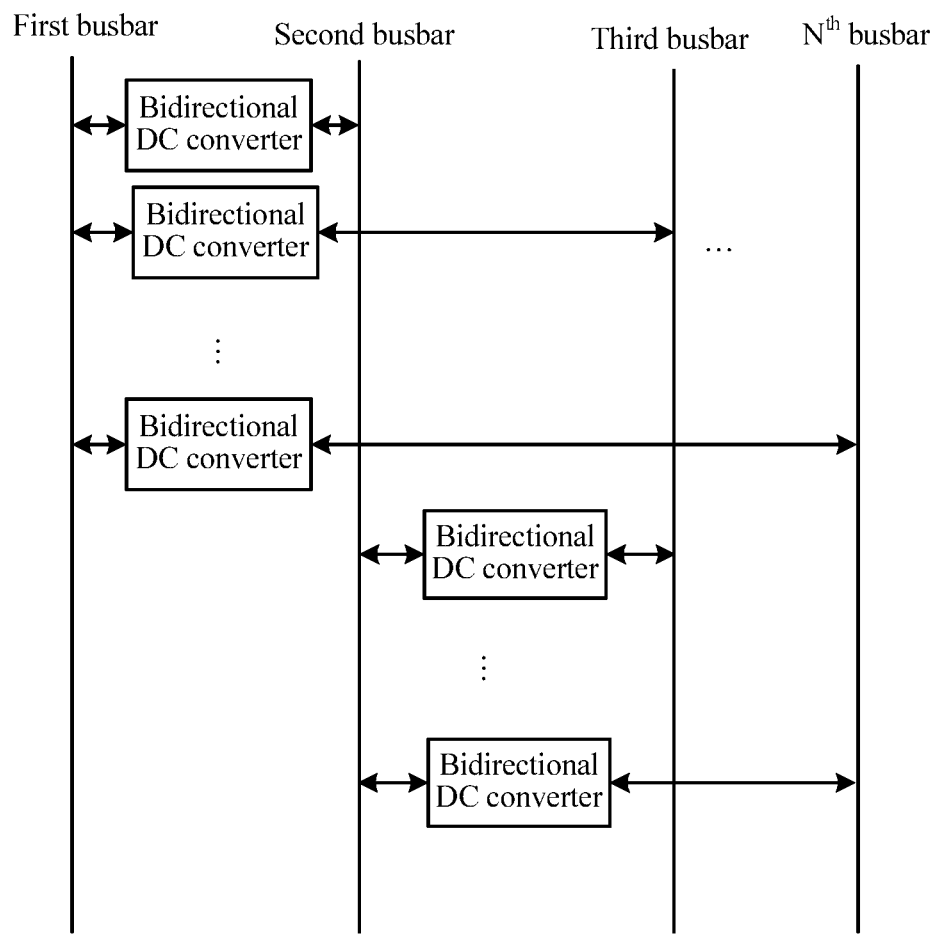
FIG. 4 is a schematic block diagram of a power supply device in a data center according to another embodiment of the present disclosure.

FIG. 4 is a schematic block diagram of a power supply device in a data center according to another embodiment of the present disclosure. The power supply device shown in FIG. 4 includes N busbars, where N is a positive integer greater than 2. The power supply device shown in FIG. 4 is similar to power supply devices shown in FIG. 2 and FIG. 3, and a difference only lies in that FIG. 4 shows the power supply device with more than two busbars, and FIG. 2 and FIG. 3 describe any two busbars of the N busbars in detail. To avoid repetition, details are not described herein again.

The power supply device shown in FIG. 4 includes a first busbar, a second busbar, a third busbar, . . . , and an $N^{th}$ busbar. A bidirectional DC converter may be connected between any two busbars.

Optionally, in another embodiment, the bidirectional DC converter between any two busbars may be added or removed according to a requirement.

It should be understood that the foregoing embodiment indicates that the first busbar and the second busbar may be directly connected and indirectly connected using the bidirectional DC converter. That the bidirectional DC converter is directly connected between the first busbar and the second busbar and the bidirectional DC converter is directly connected between the second busbar and the third busbar actually may be an indirect connection performed between the first busbar and the third busbar using two bidirectional DC converters.

In this embodiment of the present disclosure, busbars connected to batteries of different voltage levels are connected using a bidirectional converter, that is, a battery pack that supplies power to loads of different voltage levels is connected using the bidirectional converter, and therefore, energy can be scheduled between different battery packs without a need to perform backup at an input end. Therefore, in an equipment room of a data center, when an exception occurs in one path of power supply, backup time optimization of the batteries is implemented by means of energy scheduling, which improves utilization of the battery packs.

Figure 5:
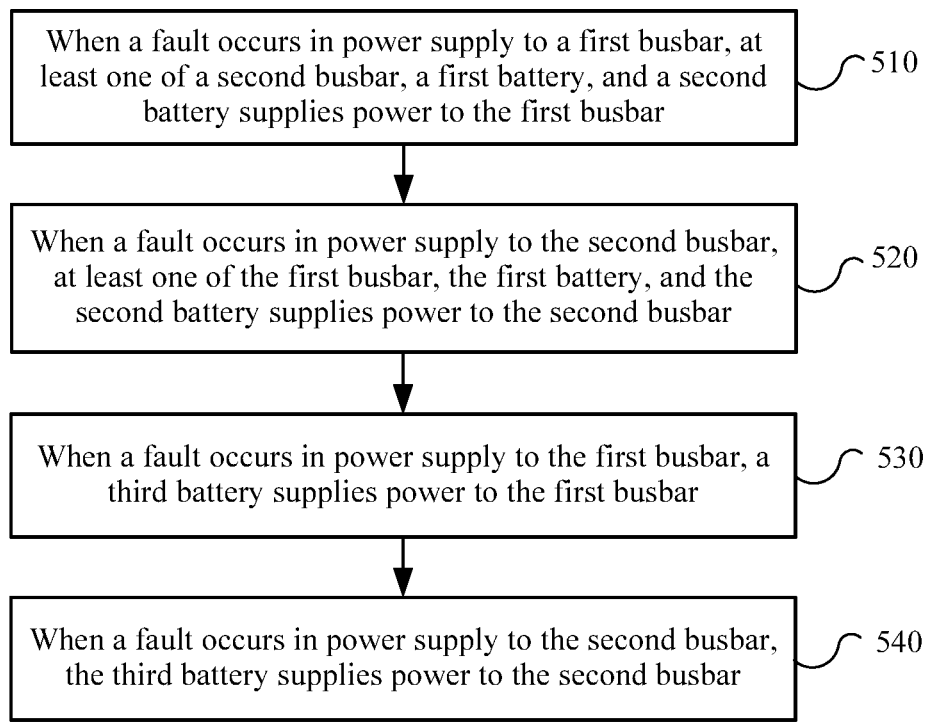
FIG. 5 is a schematic flowchart of a power supply method in a data center according to an embodiment of the present disclosure.

FIG. 5 is a schematic flowchart of a power supply method in a data center according to an embodiment of the present disclosure. The method shown in FIG. 5 may be executed by power supply devices in FIG. 2 to FIG. 4, and a power supply device to which the method is applied includes at least two busbars and at least one first bidirectional direct current converter, where a first busbar of the at least two busbars is connected to a first battery, a second busbar of the at least two busbars is connected to a second battery, a voltage level of the first battery is different from a voltage level of the second battery, and the first busbar is connected to the second busbar using the at least one first bidirectional direct current converter, and the method includes the following steps.

Step 510: When a fault occurs in power supply to the first busbar, at least one of the second busbar, the first battery, and the second battery supplies power to the first bus.

Step 520: When a fault occurs in power supply to the second busbar, at least one of the first busbar, the first battery, and the second battery supplies power to the second busbar.

In this embodiment of the present disclosure, busbars connected to batteries of different voltage levels are connected using a bidirectional converter, that is, a battery pack that supplies power to loads of different voltage levels is connected using the bidirectional converter, and therefore, energy can be scheduled between different battery packs without a need to perform backup at an input end. Therefore, in an equipment room of a data center, when an exception occurs in one path of power supply, backup time optimization of the batteries is implemented by means of energy scheduling, which improves utilization of the battery packs.

It should be understood that the first busbar and the second busbar may be any two busbars of the at least two busbars. In this embodiment of the present disclosure, only a device related to the present disclosure is described, and the power supply device may further include another device, such as a direct current power distributor, a direct current load, or an alternating current load, which are not listed one by one herein for ease of description.

Furthermore, the load may include a direct current load and an alternating current load, where a direct current power distribution apparatus may be connected between a busbar and a direct current load, and a DC/AC converter is connected between a busbar and an alternating current load, that is, a direct current is input and an alternating current is output. An AC/DC converter may be connected between a busbar and an alternating current power source, or an AC/DC converter may be connected between a busbar and another alternating current power source. Another direct current power source may also supply power to a busbar, and a DC/DC converter may be connected between the busbar and the other direct current power source.

The first bidirectional direct current converter is configured to perform energy transmission between busbars. A bidirectional direct current converter is a bidirectional reversible DC/DC converter, that is, voltages that may be separately supplied by busbars may be increased or decreased between the busbars. That is, by increasing or decreasing the voltages, a battery connected to a busbar may supply power to another busbar, thereby increasing a backup time.

The method shown in FIG. 5 may be implemented by the power supply device shown in FIG. 2. To avoid repetition, details are not described herein again.

Optionally, in another embodiment, the power supply device further includes a direct current power source, a third battery, and a second bidirectional direct current converter, where the direct current power source and the third battery are connected to the first busbar using a direct current converter, one end of the second bidirectional direct current converter is connected to the third battery, and the other end is connected to the first busbar or the second busbar, and the method further includes the following steps.

Step 530: When a fault occurs in power supply to the first busbar, the third battery supplies power to the first bus.

Step 540: When a fault occurs in power supply to the second busbar, the third battery supplies power to the second busbar.

When a fault occurs in power supply to the first busbar, the first battery may directly supply power to the first busbar, and the second busbar and the second battery may supply power to the first busbar using a bidirectional DC converter that is connected between the first busbar and the second busbar. When a fault occurs in power supply to the second busbar, the second battery may directly supply power to the second busbar, and the first busbar and the first battery may supply power to the second busbar using a bidirectional DC converter that is connected between the first busbar and the second busbar.

In this embodiment of the present disclosure, busbars connected to batteries of different voltage levels are connected using a bidirectional converter, that is, a battery pack that supplies power to loads of different voltage levels is connected using the bidirectional converter, and therefore, energy can be scheduled between different battery packs without a need to perform backup at an input end. Therefore, in an equipment room of a data center, when an exception occurs in one path of power supply, backup time optimization of the batteries is implemented by means of energy scheduling, which improves utilization of the battery packs.

It should be understood that "one embodiment" or "an embodiment" mentioned in this specification means that a specific feature, a specific structure, or a specific characteristic related to this embodiment is included in at least one embodiment of the present disclosure. Therefore, "in one embodiment" or "in an embodiment" appearing in the entire specification does not necessarily refer to a same embodiment. In addition, these specific features, structures, or characteristics may be combined into one or more embodiments in any proper manner. Sequence numbers of the foregoing processes do not mean execution sequences in various embodiments of the present disclosure. The execution sequences of the processes should be determined according to functions and internal logic of the processes, and should not be construed as any limitation on the implementation processes of the embodiments of the present disclosure.

In addition, the terms "system" and "network" may be used interchangeably in this specification. The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that in the embodiments of the present disclosure, "B corresponding to A" indicates that B is associated with A, and B may be determined according to A. However, it should also be understood that determining B according to A does not mean that B is determined only according to A, and B may also be determined according to A and/or other information.

A person of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments of the present disclosure.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

With descriptions of the foregoing embodiments, a person skilled in the art may clearly understand that the present disclosure may be implemented by hardware, firmware or a combination thereof.

In summary, what is described above is merely exemplary embodiments of the technical solutions of the present disclosure, but is not intended to limit the protection scope of the present disclosure. Any modification, equivalent replacement, or improvement made without departing from the spirit and principle of the present disclosure shall fall within the protection scope of the present disclosure.

What is claimed is:

1. A power supply device in a data center, comprising:
   at least two busbars, wherein a first busbar of the at least two busbars is connected to a first battery, wherein a second busbar of the at least two busbars is connected to a second battery, and wherein a voltage level of the first battery is different from a voltage level of the second battery; and
   at least one first bidirectional direct current converter configured to connect the first busbar and the second busbar such that the first busbar and the second busbar perform electrical energy transmission using the at least one first bidirectional direct current converter.

2. The power supply device according to claim 1, wherein the at least two busbars comprise at least one third busbar, wherein the first busbar and the second busbar are connected to the at least one third busbar using at least two first bidirectional direct current converters, and wherein the first bidirectional direct current converter is connected between any two busbars of the first busbar, the second busbar, and the at least one third busbar.

3. The power supply device according to claim 1, wherein the first bidirectional direct current converter is separately and directly connected to the first busbar and the second busbar.

4. The power supply device according to claim 3, wherein the at least two busbars comprise at least one third busbar, wherein the first busbar and the second busbar are connected to the at least one third busbar using at least two first bidirectional direct current converters, and wherein the first bidirectional direct current converter is connected between any two busbars of the first busbar, the second busbar, and the at least one third busbar.

5. The power supply device according to claim 1, further comprising:
   a direct current power source;
   a third battery; and
   a second bidirectional direct current converter,
   wherein the direct current power source and the third battery are connected to the first busbar using a direct current converter,
   wherein one end of the second bidirectional direct current converter is connected to the third battery, and
   wherein the other end of the second bidirectional direct current converter is connected to the first busbar or the second busbar.

6. The power supply device according to claim 5, wherein the at least two busbars comprise at least one third busbar, wherein the first busbar and the second busbar are connected to the at least one third busbar using at least two first bidirectional direct current converters, and wherein the first bidirectional direct current converter is connected between any two busbars of the first busbar, the second busbar, and the at least one third busbar.

7. The power supply device according to claim 5, wherein the second bidirectional direct current converter is separately and directly connected to the first busbar and the second busbar.

8. The power supply device according to claim 7, wherein the at least two busbars comprise at least one third busbar, wherein the first busbar and the second busbar are connected to the at least one third busbar using at least two first bidirectional direct current converters, and wherein the first bidirectional direct current converter is connected between any two busbars of the first busbar, the second busbar, and the at least one third busbar.

9. A power supply method in a data center, wherein a power supply device to which the method is applied comprises at least two busbars and at least one first bidirectional direct current converter, wherein a first busbar of the at least two busbars is connected to a first battery, wherein a second busbar of the at least two busbars is connected to a second battery, wherein a voltage level of the first battery is different from a voltage level of the second battery, wherein the first busbar is connected to the second busbar using the at least one first bidirectional direct current converter, and wherein the method comprises:
    supplying, by at least one of the second busbar, the first battery, and the second battery, power to the first busbar when a fault occurs in power supply to the first busbar; and
    supplying, by at least one of the first busbar, the first battery, and the second battery, power to the second busbar when the fault occurs in power supply to the second busbar.

10. The power supply method according to claim 9, wherein the power supply device further comprises a direct current power source, a third battery, and a second bidirectional direct current converter, wherein the direct current power source and the third battery are connected to the first busbar using a direct current converter, wherein one end of the second bidirectional direct current converter is connected to the third battery, wherein the other end of the second bidirectional direct current converter is connected to the first busbar, and wherein the method further comprises supplying, by the third battery, power to the first busbar when the fault occurs in power supply to the first busbar.

11. The power supply method according to claim 9, wherein the power supply device further comprises a direct current power source, a third battery, and a second bidirectional direct current converter, wherein the direct current power source and the third battery are connected to the first busbar using a direct current converter, wherein one end of the second bidirectional direct current converter is connected to the third battery, wherein the other end of the second bidirectional direct current converter is connected to the second busbar, and wherein the method further comprises supplying, by the third battery, power to the second busbar when the fault occurs in power supply to the second busbar.

12. A power supply device in a data center, comprising:
    at least two busbars, wherein a first busbar of the at least two busbars is coupled to a first battery, wherein a second busbar of the at least two busbars is coupled to a second battery, and wherein a voltage level of the first battery is different from a voltage level of the second battery; and
    at least one first bidirectional direct current converter configured to couple the first busbar and the second busbar such that the first busbar and the second busbar perform electrical energy transmission using the at least one first bidirectional direct current converter.

13. The power supply device according to claim 12, wherein the first bidirectional direct current converter is separately and directly coupled to the first busbar and the second busbar.

14. The power supply device according to claim 13, wherein the at least two busbars comprise at least one third busbar, wherein the first busbar and the second busbar are coupled to the at least one third busbar using at least two first bidirectional direct current converters, and wherein the first bidirectional direct current converter is coupled between any two busbars of the first busbar, the second busbar, and the at least one third busbar.

15. The power supply device according to claim 12, further comprising:
    a direct current power source;
    a third battery; and
    a second bidirectional direct current converter,
    wherein the direct current power source and the third battery are coupled to the first busbar using a direct current converter,
    wherein one end of the second bidirectional direct current converter is coupled to the third battery, and
    wherein the other end of the second bidirectional direct current converter is coupled to the first busbar or the second busbar.

16. The power supply device according to claim 15, wherein the at least two busbars comprise at least one third busbar, wherein the first busbar and the second busbar are coupled to the at least one third busbar using at least two first bidirectional direct current converters, and wherein the first bidirectional direct current converter is coupled between any two busbars of the first busbar, the second busbar, and the at least one third busbar.

17. The power supply device according to claim 15, wherein the second bidirectional direct current converter is separately and directly coupled to the first busbar and the second busbar.

18. The power supply device according to claim 17, wherein the at least two busbars comprise at least one third busbar, wherein the first busbar and the second busbar are coupled to the at least one third busbar using at least two first bidirectional direct current converters, and wherein the first bidirectional direct current converter is coupled between any two busbars of the first busbar, the second busbar, and the at least one third busbar.

19. The power supply device according to claim 12, wherein the at least two busbars comprise at least one third busbar, wherein the first busbar and the second busbar are coupled to the at least one third busbar using at least two first bidirectional direct current converters, and wherein the first bidirectional direct current converter is coupled between any two busbars of the first busbar, the second busbar, and the at least one third busbar.

\* \* \* \* \*